United States Patent [19]
Baxter et al.

[11] Patent Number: 5,354,091
[45] Date of Patent: Oct. 11, 1994

[54] WHEELED VEHICLE SUSPENSIONS

[75] Inventors: Bobby G. Baxter; Jeffrey E. Ditto, both of Warrenton, Mo.

[73] Assignee: The Binkley Company, Warrenton, Mo.

[21] Appl. No.: 938,607

[22] Filed: Sep. 1, 1992

[51] Int. Cl.⁵ .............................................. B60G 5/00
[52] U.S. Cl. ................... 280/683; 267/37.2; 267/47; 267/52; 280/686
[58] Field of Search ............... 280/680, 686, 683, 677, 280/678, 681, 682; 267/47, 52, 260, 37.2, 269

[56] References Cited
U.S. PATENT DOCUMENTS

| | | | |
|---|---|---|---|
| 3,202,440 | 8/1965 | Apgar, Sr. | 280/686 |
| 4,530,515 | 7/1985 | Raidel | 280/683 |
| 4,598,900 | 7/1986 | Yamamoto et al. | 267/52 |
| 4,768,807 | 9/1988 | McGibbon et al. | 267/269 |
| 4,813,695 | 3/1989 | Reid | 280/680 |
| 4,871,188 | 10/1989 | Baxter | 280/680 |
| 5,078,420 | 1/1992 | Jable et al. | 280/686 |
| 5,088,758 | 2/1992 | Wall et al. | 280/683 |

*Primary Examiner*—Eric Culbreth
*Attorney, Agent, or Firm*—Senniger, Powers, Leavitt & Roedel

[57] ABSTRACT

Air-ride suspensions for vehicles include composite leaf springs having fibers embedded in a resin matrix. Air springs are interposed between the leaf springs and the vehicle adjacent free ends of the leaf springs.

32 Claims, 8 Drawing Sheets

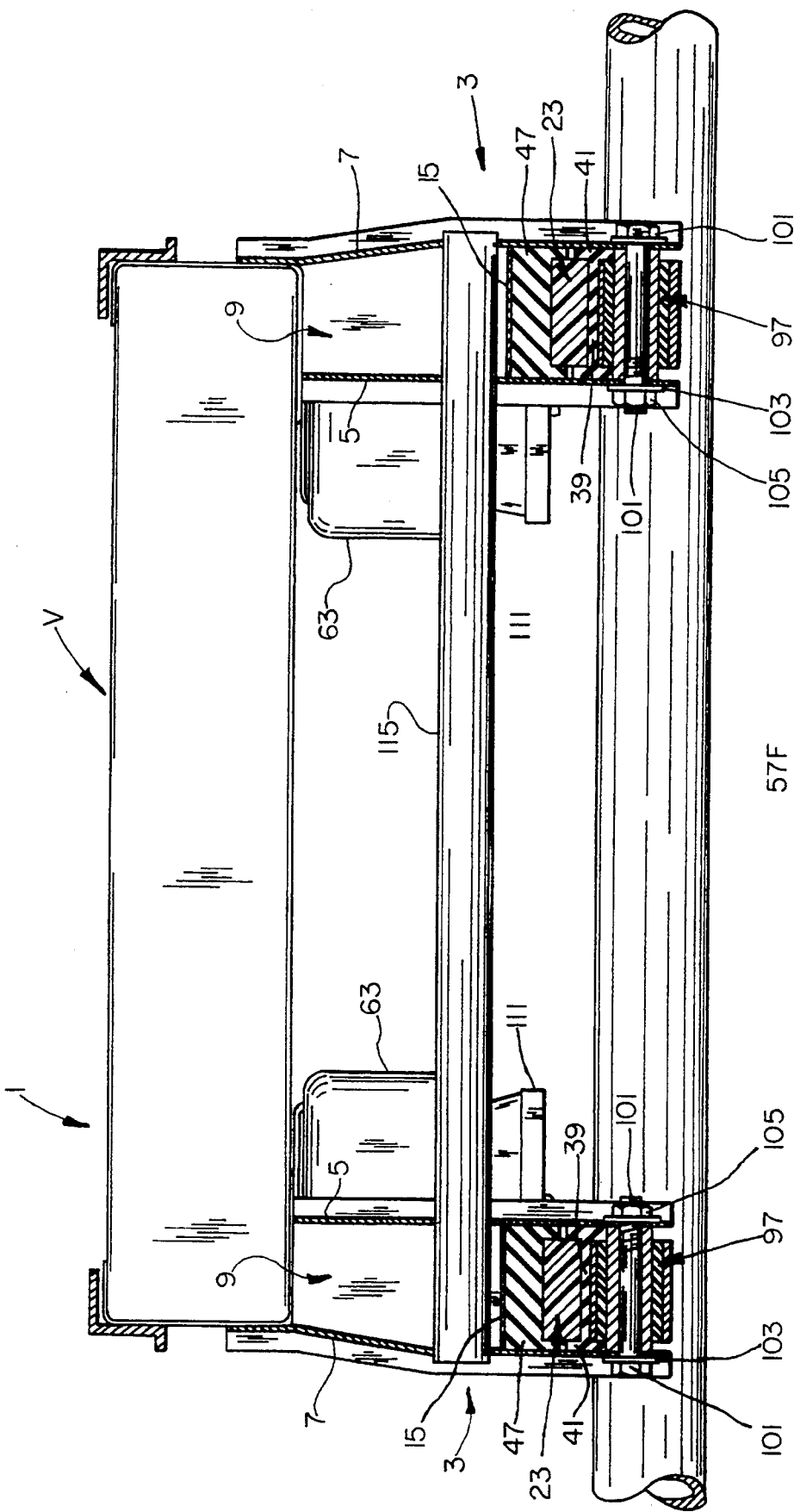

WHEELED VEHICLE SUSPENSIONS

BRIEF SUMMARY OF THE INVENTION

This invention relates to wheeled vehicle suspensions, and more particularly to such suspensions including air springs, referred to as air-ride suspensions.

Reference may be made to U.S. Pat. No. 4,871,188 issued Oct. 3, 1989 relating to suspensions for tandem axles of a vehicle, referred to as tandem axle suspensions, including composite leaf springs, and showing in FIGS. 15-19 thereof a tandem axle air-ride suspension including composite leaf springs and air springs (air bags). This invention involves improvements on that tandem axle composite leaf spring/air-ride suspension, the improvements also being applicable to single axle composite leaf spring/air-ride suspensions, widespread tandem axle composite leaf spring/air-ride suspensions and triple axle (tri-axle) composite leaf spring/air-ride suspensions, enabling the provision of air-ride suspensions which are of relatively economical and light-weight construction and which are subject to less wear and require less maintenance.

In general, a composite leaf spring/air-ride suspension of this invention comprises at least one pair of hangers, one for the left side and the other for the right side of the vehicle, each hanger comprising a head and a pair of side members at opposite sides of the head extending down from the head. One of the hangers is mounted extending down from the bottom of the vehicle adjacent its left side and the other is mounted extending down from the bottom of the vehicle adjacent its right side, the hangers being aligned transversely with respect to the vehicle and mounted with the side members of the hangers spaced transversely with respect to the vehicle. The suspension further comprises at least one pair of composite leaf springs, one for the left and one for the right side of the vehicle, each having an upwardly facing surface and a downwardly facing surface, each composite leaf spring comprising fibers embedded in a resin matrix, the fibers extending lengthwise of the spring, and means for resiliently mounting each leaf spring in a respective hanger with the leaf spring extending longitudinally of the vehicle between the side members of the hanger below the head. The resilient mounting means comprises a lower elastomeric cushion retained in the hanger below the leaf spring engaged by the downwardly facing surface of the leaf spring and an upper elastomeric cushion retained in the hanger above the leaf spring and between the leaf spring and the head of the hanger and engaging the upwardly facing surface of the leaf spring, the portion of the leaf spring extending between said elastomeric members being resiliently cushioned therebetween and thereby resiliently yieldable up and down in the hanger. The leaf springs have free ends spaced longitudinally with respect to the vehicle from the hangers and aligned transversely with respect to the vehicle. An axle is secured to the leaf springs adjacent their free ends, the axle extending transversely with respect to the vehicle. Air springs are interposed between the leaf springs and the vehicle adjacent the free ends of the leaf springs; and the suspension further comprises means limiting the longitudinal movement of each leaf spring in the respective hanger comprising link means pivotally connected at one end to the respective hanger and at the other end to the leaf spring adjacent the free end of the leaf spring where the axle is secured to the leaf spring.

Other objects and features will be in part apparent and in part pointed out hereinafter.

BRIEF DESCRIPTION OF THE DRAWINGS

FIG. 2 is a transverse vertical section on line 2—2 of FIG. 1;

Corresponding reference characters indicate corresponding parts throughout the drawings.

DETAILED DESCRIPTION

Figure 1:
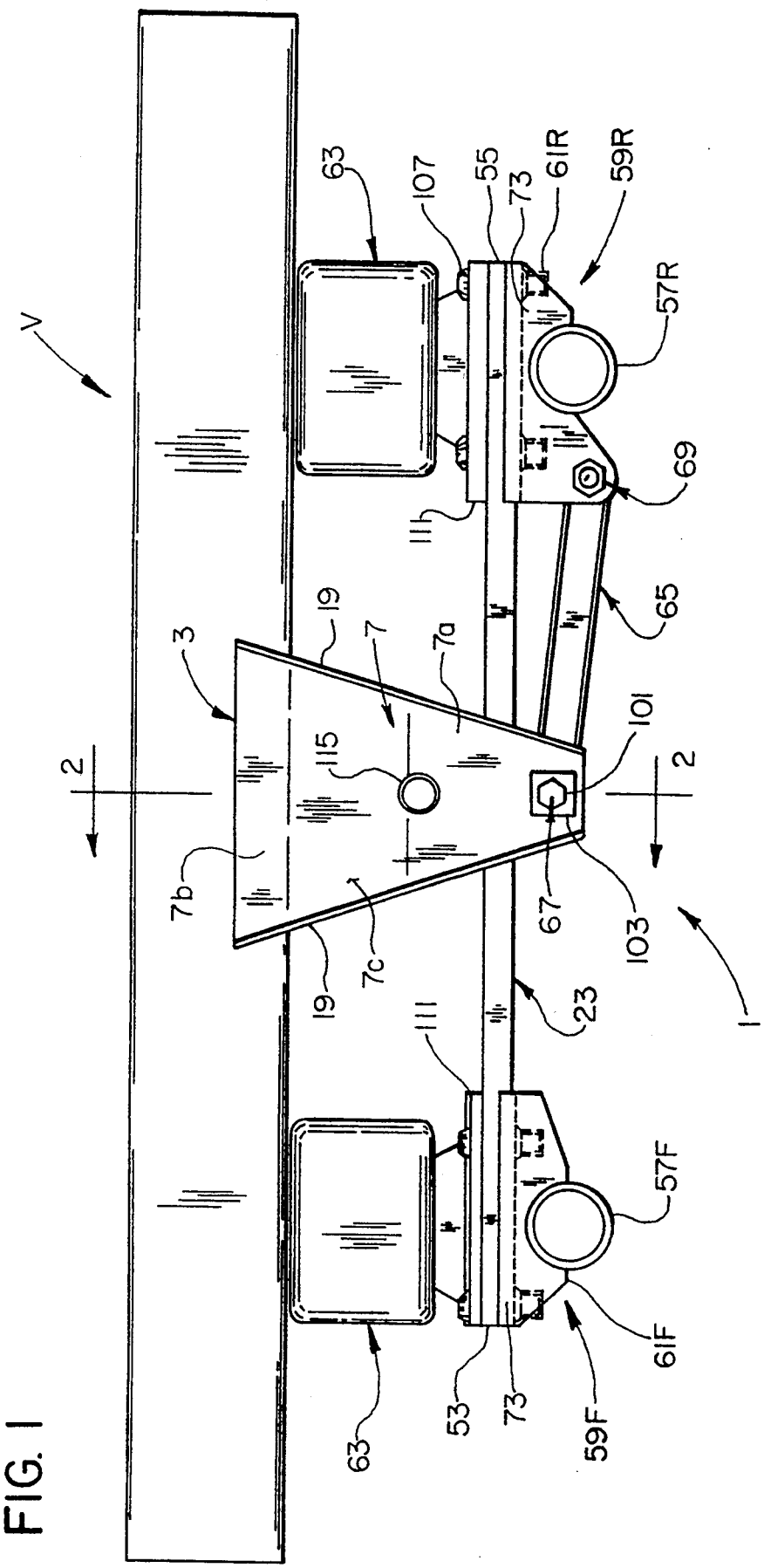
FIG. 1 is a side elevation of a tandem axle air-ride suspension of this invention.
Figure 2A:
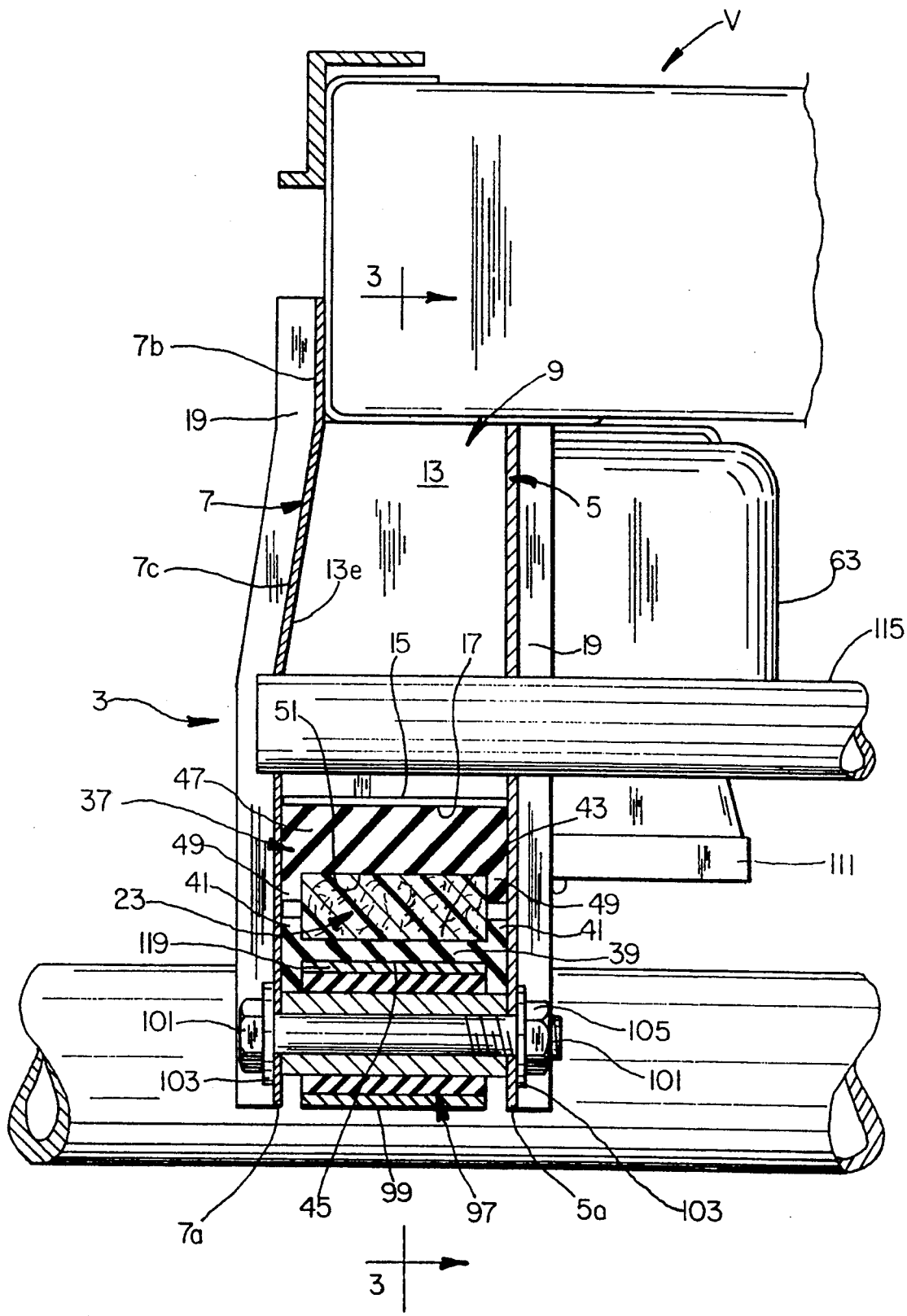
FIG. 2A is an enlarged fragment of FIG. 2.
Figure 3:
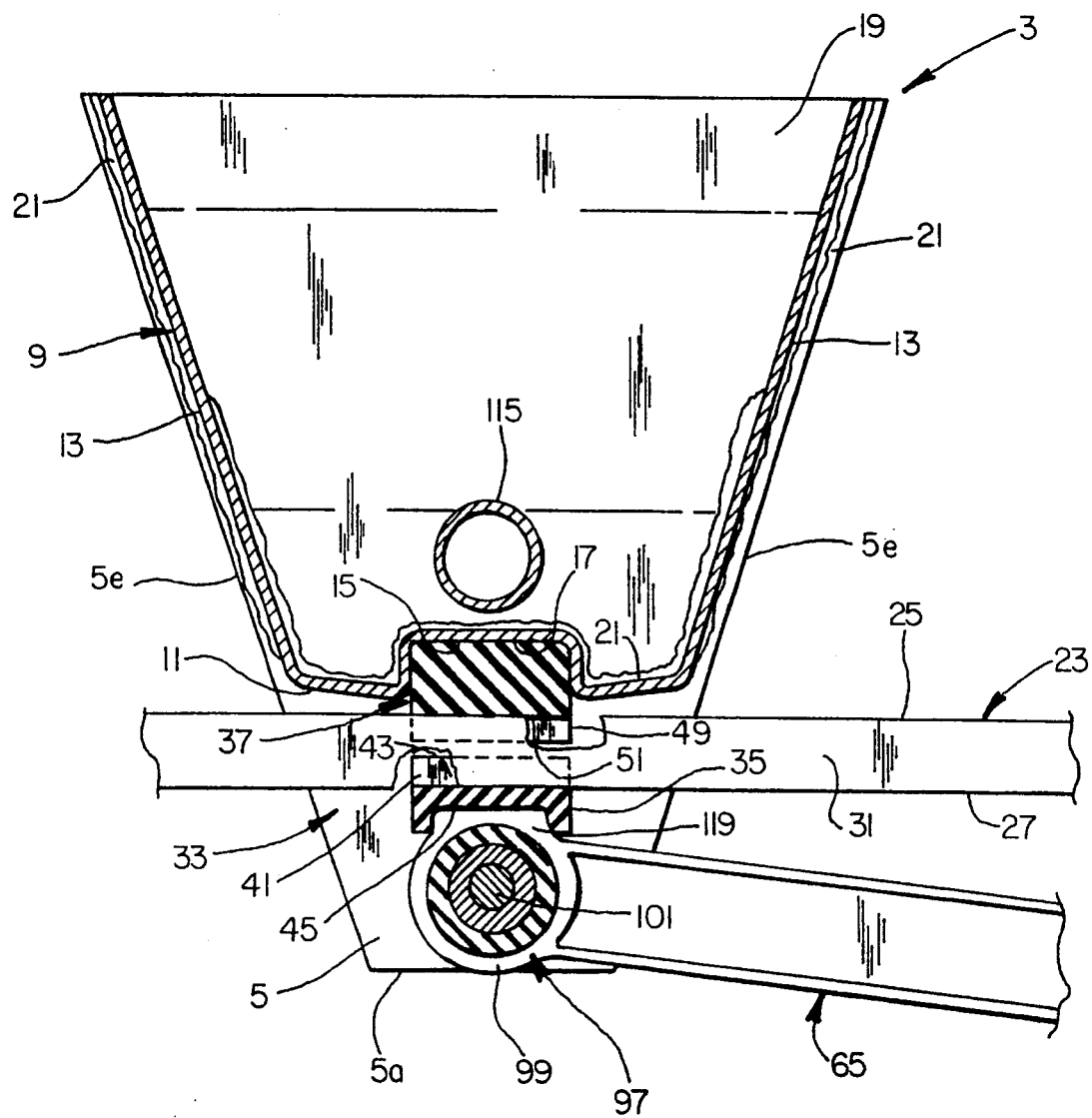
FIG. 3 is a vertical section on line 3—3 of FIG. 2A.
Figure 4:
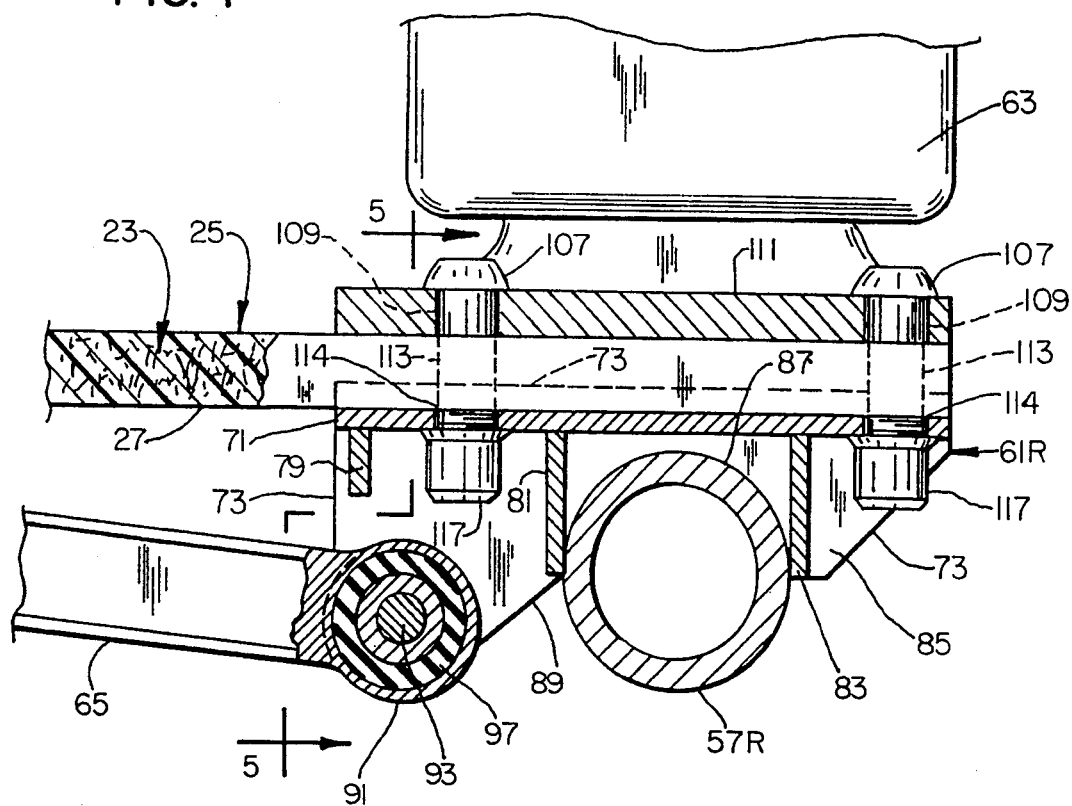
FIG. 4 is an enlarged fragment of FIG. 1 with parts broken away and shown in section.
Figure 5:
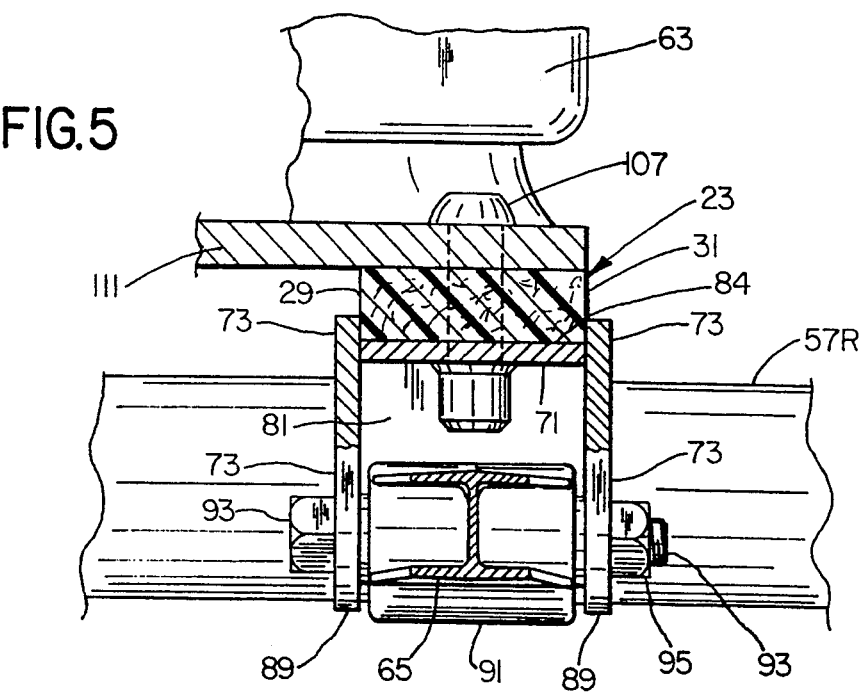
FIG. 5 is a view in section on line 5—5 of FIG. 4.

Referring first to FIGS. 1-5, a tandem axle composite leaf spring/air-ride suspension 1 of this invention is shown to comprise a pair of hangers, each generally designated 3, one hanger for the left side and the other for the right side of a vehicle generally indicated at V. Each hanger comprises an inner side member 5 and an outer side member 7 at the inner and outer ends of a cross-member or head 9. The latter is formed of a piece of sheet metal bent generally to W shape in cross section, thereby having a bottom web 11 and integral flanges each designated 13 angled upward and outward from opposite sides of the web. The web 11 is formed at the center thereof with an upstruck downwardly opening channel formation 15 extending from one end of the head 9 to the other, i.e. extending from one side plate to the other, thus providing a downwardly opening recess or groove 17 in the web at the bottom of the head.

Each of the side members 5 and 7 is constituted by a sheet metal plate having side edges such as indicated at 5e for the side member or plate 5 angled in correspondence with the flanges 13 of the head 9, and being outwardly flanged at its side edges as indicated at 19 for stiffening it. The inner side plate 5 extends down from the level of the top of the head well below the bottom web 11 of the head and the outer side plate 7 extends down from a point above the level of the top of the head to a point well below the bottom web of the head so that the two side plates have lower portions 5a, 7a in transversely spaced opposed relation below the level of the web. The side plates are welded to the end edges of the head (to the end edges of both the web and flanges of the head) as indicated at 21 in FIG. 3. As appears in FIGS. 2 and 2A, the inner side plate 5 is generally vertical and flat throughout (except for the stiffening flanges 19). The outer side plate 7 is bent to have an upper vertical portion 7b above the top of the head, an outwardly angled intermediate portion 7c and the lower vertical portion 7a. The flanges 13 of the head have inclined outer end edges 13e against which the angled intermediate portion 7c of the outer side plate 7 engages. Each hanger is secured at its respective side of the vehicle V as by welding to the bed of the vehicle with the upper portion 7b of the outer side plate 7 of the hanger extending up on the outside of the bed and the upper edge of the inner side plate 5 and the upper edges of flanges 13 of the head engaging the bottom of the bed, this type of mounting being referred to as a straddle mount. Alternatively, the hangers may be made for securement to the bottom of longitudinal beams of the bed of a vehicle for a type of mounting referred to as an under mount.

The tandem axle suspension 1 further comprises a pair of composite leaf springs, each designated 23, one for the left side and the other for the right side of the vehicle. Each of these is similar to the composite springs described in the aforesaid U.S. Pat. No. 4,871,188, which is incorporated herein by reference, comprising fibers embedded in a resin matrix, the fibers extending lengthwise of the spring. As shown, each composite leaf spring is of rectangular cross section having an upper surface 25, a lower surface 27, and inner and outer side surfaces 29 and 31, respectively. Each leaf spring is resiliently mounted in a respective hanger by means indicated generally at 33 in FIG. 3, with the leaf spring extending longitudinally of vehicle between the side plates 5 and 7 of the hanger below the head 9. Each leaf spring is normally in a generally vertical plane which extends longitudinally of the vehicle, each spring extending longitudinally of the vehicle, and swingable generally on a generally indeterminate axis extending transversely of the vehicle in said vertical plane one way or the other from a horizontal position, thereby constituting a walking beam.

The resilient mounting means 33 comprises a lower elastomeric cushion or pad 35 retained in the hanger 3 below the leaf spring 23 engaged by the downwardly facing lower surface 27 of the leaf spring and an upper elastomeric cushion or pad 37 retained in the hanger above the leaf spring and between the leaf spring and the web 11 of the head of the hanger and engaging the upwardly facing surface 25 of the leaf spring.

The lower cushion 35 is generally of channel shape in transverse cross section, having a bottom web 39 and flanges 41 extending up from the web at opposite sides of the web, thus having an upwardly opening groove 43 in its upper face extending longitudinally with respect to the vehicle. The leaf spring is received in this groove, its lower surface 27 engaging the bottom of the groove. The flanges 41 of the lower cushion extend up at opposite sides of the leaf spring, terminating somewhat short of midheight of the spring. The lower cushion 35 has a downwardly opening recess 45 in its bottom. The upper cushion 37 is generally of inverted channel shape in transverse cross section having a top web 47 and flanges 49 extending down from the web at opposite sides of the web, thus having a downwardly opening groove 51 in its lower face extending longtiudinally with respect to the vehicle. The leaf spring 23 is received in this groove, its upper surface 25 being interengageable with the top of the groove. The side flanges 49 of the upper cushion 37 extend down at opposite sides of the spring, terminating somewhat short of midheight of the spring. The upper cushion 37 is pocketed in the recess 17 at the bottom of the head 9, the overall width of the upper cushion 37 corresponding to the width of this recess. At present, it is preferred that the cushions 35 and 37 be made of natural rubber having a 70±5 durometer.

Each leaf spring 23 is resiliently mounted, as above described, in its respective hanger 3 generally at the center of length of the spring and extends generally equally forward and rearward from the hanger 3, having forward and rearward free ends 53 and 55. At 57F is indicated a forward axle rigidly attached adjacent each end thereof to the respective spring 23 adjacent the forward free end 53 of the spring at a joint 59F and at 57R is indicated a rear axle rigidly attached adjacent each end thereof to the respective spring 23 adjacent the rearward end 55 of the spring at a joint 59R. Each forward axle joint 59F comprises an axle seat 61F and each rearward axle joint 59R comprises an axle seat 61R, these axle seats being rigidly attached to the springs adjacent their free ends on the bottom of the springs. Air springs (air bags) 63 are interposed between the leaf springs 23 and the bottom of the vehicle adjacent both the forward and rearward free ends of the springs. At 65 is indicated means for limiting the longitudinal movement of each leaf spring 23 in its respective hanger 3, this means comprising a link (which may also be referred to as a torque arm) pin-connected at one end as indicated at 67 in a respective hanger and pin-connected at its other end as indicated at 69 to the respective axle seat.

The rear axle seat 61R comprises an elongate top plate 71 having a width corresponding to the width of each composite leaf spring 23, side plates each designated 73 secured as by welding to the side edges of the plate 71 and reinforcing crossplates 79, 81 and 83 extending transversely of the seat between the side plates and secured as by welding to the plates. The side plates 73 extend up above the top plate 71, forming a channel 84 at the top of the seat extending lengthwise of the seat and have portions 85 toward one end of (the rearward end) the seat having downwardly directed semi-circular recesses 87 in which the axle, which is of circular cross-section, is seated, being welded to the side plates. These recesses are located between the crossplates 81 and 83. The portions 89 of the side plates toward the other end of the seat extend farther downward than the portions 85. The link 65 has a tubular crosshead 91 received between these portions 89 of the side plates receiving a headed bolt 93 providing for the pin connection of the link to the seat. At 95 is indicated a nut threaded on the end of the bolt to hold it in place, and at 97 is indicated rubber bushing means for the pin joint at 69. The link 65 has a tubular crosshead 99 at its other end received between the side plates 5 and 7 of the respective hanger 3 receiving a headed bolt 101 providing the pin connection for the link to the hanger. The side plates of the hanger are reinforced as indicated at 103, and at 105 is indicated a nut threaded on the bolt. The forward axle seat 61F is generally identical to the rear axle seat 61R, but without the bolt holes.

The top or web plate 71 of each rear axle seat 61R is secured to the underside 27 of the respective leaf spring 23 adjacent the rearward free end 55 of the leaf spring, with the leaf spring seated in the channel 84 formed by the plate 71 and the upwardly extending portions of the side plates 73 by means of headed bolts 107 extending through holes 109 in an air spring supporting plate 111 on top of the spring and through holes 113 in the spring and holes 114 in the top plate 71 of the seat, nuts being threaded on the lower ends of the bolts as indicated at 117. Each air spring supporting plate 111 is cantilevered inwardly from the respective leaf spring 23 and an air spring (an air bag) 63 is interposed between each plate 111 and the bottom of the vehicle V. A cross-brace for the two hangers 3 is indicated at 115.

Each of the upper cushions 37 is retained in the respective hanger 3 between the side plates 5 and 7 of the hanger and between the leaf spring 23 and the bottom web 11 of the head 9 of the hanger, being held against sliding forward or rearward out of the hanger by being pocketed in the recess 17 in the web 11. Each of the lower cushions 35 is retained in the respective hanger 3 between the side plates 5 and 7 of the hanger and between the leaf spring 23 and the crosshead 99 of the respective link 65, the crosshead 99 having an external projection or lobe 119 received in the recess 45 in the bottom of the lower cushion 35. The arrangement is such that each spring 23 is resiliently mounted both vertically and laterally in its respective hanger, i.e. the spring is yieldingly movable vertically in the hanger by reason of its extending between the side flanges 49 and 41 of the upper and lower cushions. As installed in the hanger, the leaf spring is gripped between the cushions, which are under some compression. As the spring swings in the hanger, the cushions deform, and there is no sliding contact of the spring with any metal parts of the hanger such as would tend to cause wear of the spring.

As herein illustrated, the link or torque arm 65 is a fixed-length link. It will be understood that one or both of the links 65 may be an adjustable length link such as shown in FIG. 11 designated 65A similar to the adjustable length link 71 shown in FIG. 10 of the aforesaid U.S. Pat. No. 4,871,188.

Figure 6:
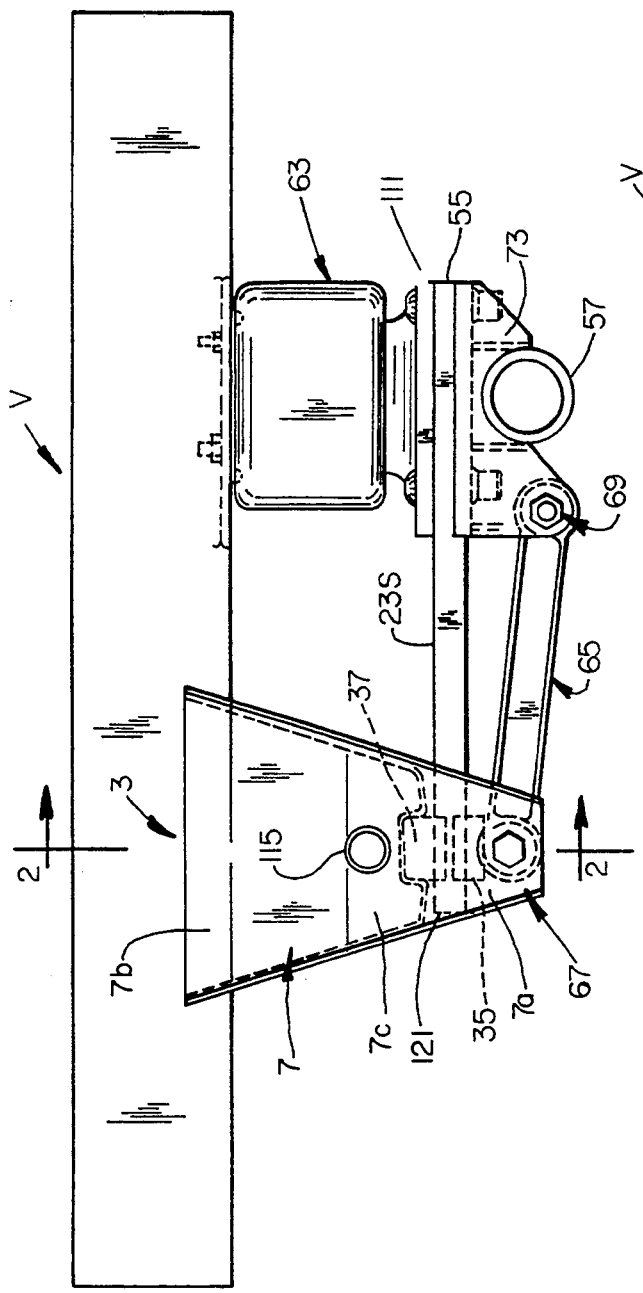
FIG. 6 is a side elevation of a single axle suspension of this invention.

FIG. 6 illustrates a single axle composite leaf spring-/air ride suspension of this invention, which is substantially identical to the tandem axle suspension of FIG. 1 except that it has a single rear axle (designated 57) and the leaf springs, specially designated 23S, are shorter, having forward ends indicated at 121 opposite their rearward free ends 55 resiliently mounted by means of the cushions 35 and 37 in the hangers 3.

Figure 7:
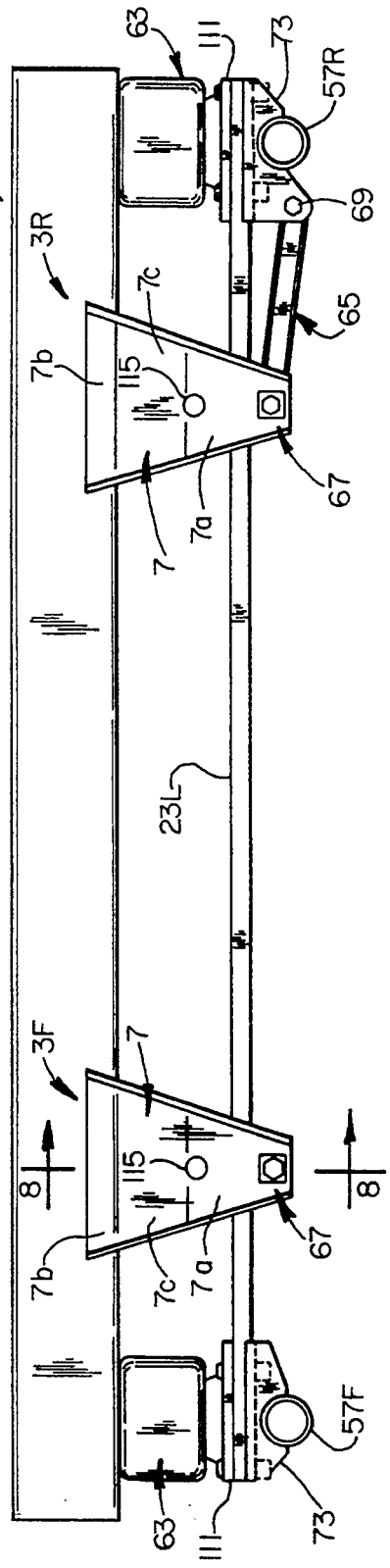
FIG. 7 is a side elevation of a widespread tandem axle suspension of this invention.
Figure 8:
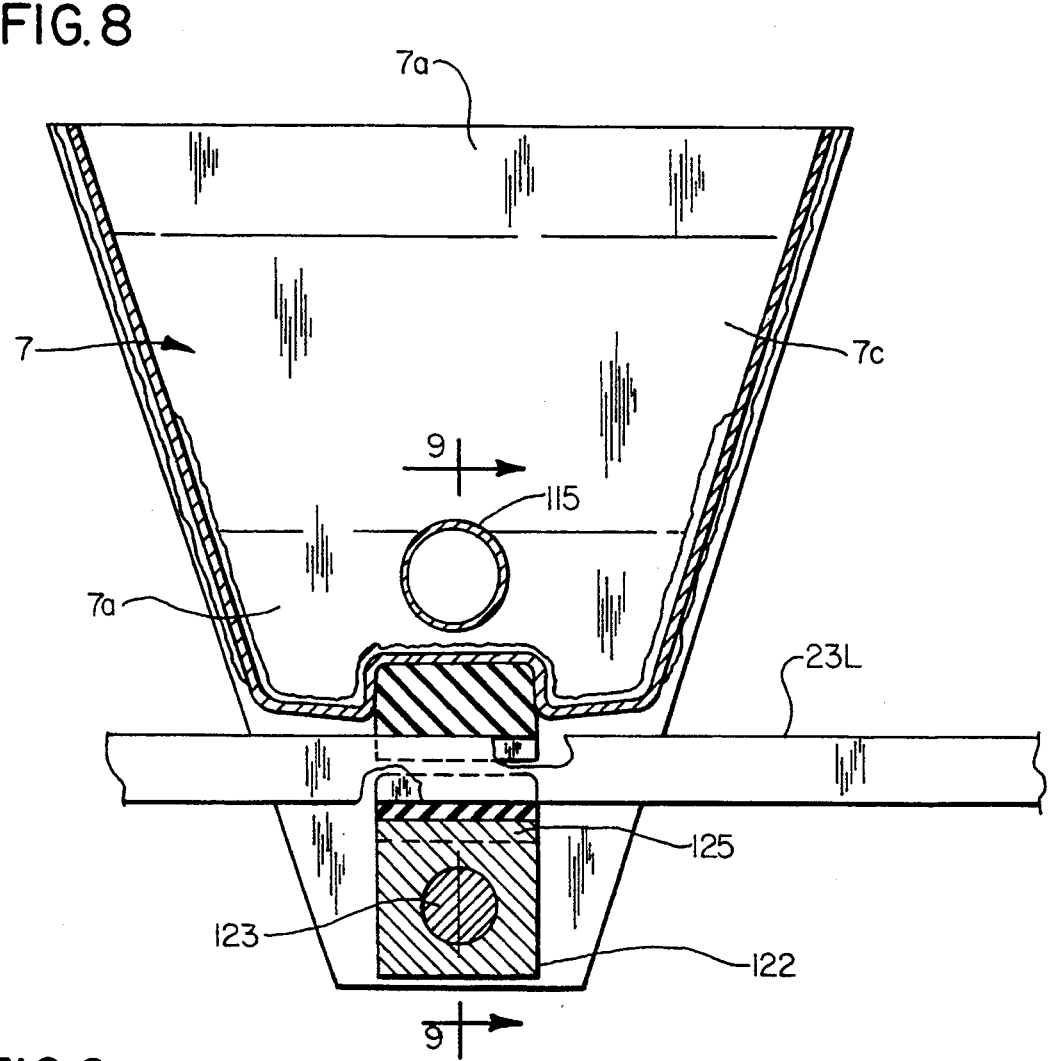
FIG. 8 is a view in section similar to FIG. 3 showing the widespread tandem axle suspension shown in FIG. 7.
Figure 9:
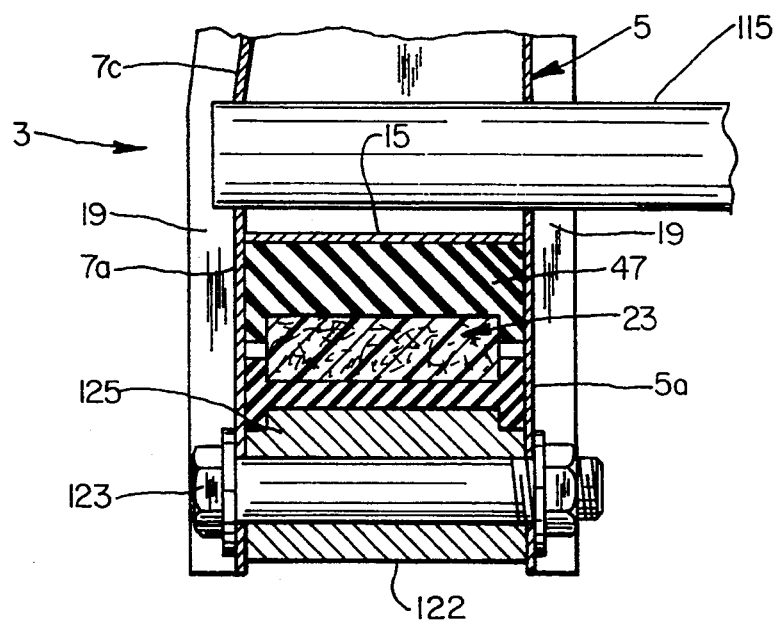
FIG. 9 is a view in section on line 9—9 of FIG. 8.

FIGS. 7-9 illustrate a widespread tandem axle suspension of this invention having a first pair of hangers constituting a rearward pair of hangers specially designated 3R and a second pair of hangers, specially designated 3F, constituting a forward pair of hangers, spaced longitudinally with respect to the vehicle. The leaf springs, specially designated 23L, are substantially longer than the leaf springs 23 shown in FIG. 1, being mounted by means of the elastomeric cushions 35, 37 in the hangers 3R and 3F of both of the pairs of hangers, extending generally equally rearward from the rearward pair of hangers 3R and forward from the forward pair of hangers 3F. The rearward axle 57R is secured to the rearward ends 55 of the leaf springs rearward of its rearward hangers 3R and the forward axle 57F is secured to the forward ends 53 of the springs forward of the forward hangers 3F. Air springs 63 are provided at the rearward and forward ends of the leaf springs as in the FIG. 1 tandem axle suspension. Links 65 are interconnected between the rearward hangers 3R and the rearward axle seats. The leaf springs are held up in the forward hangers by blocks 122 as shown in FIGS. 8 and 9, each secured by a bolt 123 in its respective hanger and having a portion 125 on the top corresponding to lobe 117 received in the bottom recess 45 of the respective lower cushion 35. Details are the same as in the tandem axle suspension. The hangers 3R and 3F support the springs at approximately one-fourth the spring length from the respective ends of the springs, i.e. the first pair of hangers 3R is spaced generally one-fourth the spacing of the rearward and forward axles 57R, 57F forward of the rearward axle 57R and the second pair of hangers 3F is spaced generally one-fourth the spacing of the rearward and forward axles rearward of the forward axle 57F.

Figure 10:
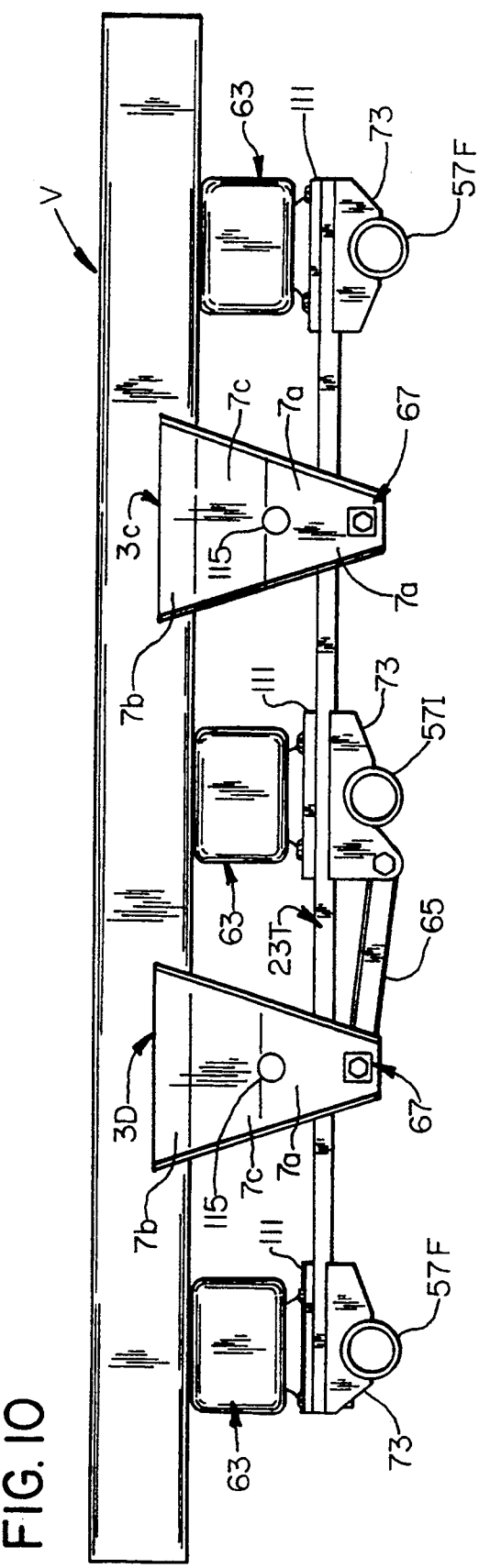
FIG. 10 is a side elevation of a triple axle suspension of this invention.
Figure 11:
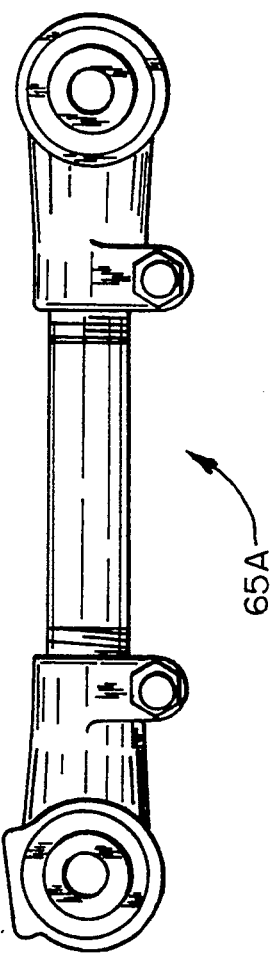
FIG. 11 is a view of an adjustable link or torque arm which may be incorporated in any of the suspensions.

FIG. 10 illustrates a triple axle suspension of this invention having a first pair of hangers 3C constituting a rearward pair of hangers and a second pair of hangers 3D constituting a forward pair of hangers spaced longitudinally with respect to the vehicle. The leaf springs, here designated 23T, extend through the hangers and project generally equally rearward from the rearward pair of hangers and forward from the forward pair of hangers. Rearward and forward axles 57R, 57F are provided at the rearward and forward ends of the springs with joints which may be identical to the above-described joints and an intermediate axle 57I is secured to the springs by means of an axle seat, which may be identical to the seat 61R and an air spring supporting plate 111, midway between the rearward and forward hangers. Air springs 63 are provided at the rearward and forward ends of the leaf springs 23T and midway of the rearward and forward hangers. Details are the same as in the other suspensions above described.

It will be understood that any one of the above-described suspensions may have the hangers carried by a slide, such as that sold under the trademark LITE-SLIDE by The Binkley Company of Warrenton, Mo., the assignee of this invention.

As various changes could be made in the above constructions without departing from the scope of the invention, it is intended that all matter contained in the above description and shown in the accompanying drawings shall be interpreted as illustrative and not in a limiting sense.

What is claimed is:

1. An air-ride suspension for a vehicle comprising:
at least one pair of hangers, one for the left side and the other for the right side of the vehicle;
each hanger comprising a head and a pair of side members at opposite sides of the head extending down from the head,
one of the hangers being mounted extending down from the bottom of the vehicle adjacent its left side and the other being mounted extending down from the bottom of the vehicle adjacent its right side, the hangers being aligned transversely with respect to the vehicle and with the side members of the hangers spaced transversely with respect to the vehicle,
at least one pair of composite leaf springs, one for the left and one for the right side of the vehicle, each having an upwardly facing surface and a downwardly facing surface;
each composite leaf spring comprising fibers embedded in a resin matrix, the fibers extending lengthwise of the spring;
means for resiliently mounting each leaf spring in a respective hanger with the leaf spring extending longitudinally of the vehicle between the side members of the hanger below the head,
said resilient mounting means comprising a lower elastomeric cushion retained in the hanger below the leaf spring engaged by the downwardly facing surface of the leaf spring and an upper elastomeric cushion retained in the hanger above the leaf spring and between the leaf spring and the head of the hanger and engaging the upwardly facing surface of the leaf spring;

the portion of the leaf spring extending between said elastomeric members being resiliently cushioned therebetween and thereby resiliently yieldable up and down in the hanger;

the leaf springs having free ends spaced longitudinally with respect to the vehicle from the hangers and aligned transversely with respect to the vehicle;

an axle secured to the leaf springs adjacent their free ends and extending transversely with respect to the vehicle;

air springs interposed between the leaf springs and the vehicle adjacent the free ends of the leaf springs; and means limiting the longitudinal movement of each leaf spring in the respective hanger comprising link means pivotally connected at one end to the respective hanger and at the other end to the leaf spring adjacent the free end of the leaf spring where the axle is secured to the leaf spring, wherein said head of each hanger has a downwardly opening recess therein and the upper elastomeric cushion is pocketed in the recess to limit the longitudinal movement of the upper elastomeric cushion.

2. An air-ride suspension as set forth in claim 1 wherein said elastomeric cushion has a width corresponding to the width of the recess for securing the elastomeric cushion in the recess of the head.

3. An air-ride suspension as set forth in claim 1 wherein the upper elastomeric cushion has a downwardly opening groove in the bottom thereof extending longitudinally with respect to the vehicle receiving the leaf spring.

4. An air-ride suspension as set forth in claim 3 wherein the head of each hanger comprises a sheet metal member of channel shape in vertical cross section transversely of the vehicle having a web constituting the bottom wall of the head and flanges extending up at opposite sides of said web, the web being formed with an upwardly offset portion forming said recess, the side members of the hanger being constituted by sheet metal plates welded to the end edges of the web and flanges of the head.

5. An air-ride suspension as set forth in claim 1 wherein each link means is pivotally connected to the respective hanger by being pinned in the respective hanger between the side members thereof and each lower elastomeric cushion is mounted in the respective hanger on the end of the link means which is pinned in the hanger.

6. An air-ride suspension as set forth in claim 5 wherein each lower elastomeric cushion has a downwardly opening recess in its bottom and the end of the respective link means pinned in the respective hanger has a lobe received in said recess.

7. An air-ride suspension as set forth in claim 6 wherein each lower elastomeric cushion has an upwardly opening groove in its upper face extending longitudinally with respect to the vehicle receiving the respective leaf spring.

8. An air-ride suspension as set forth in claim 7 wherein the leaf spring is of rectangular cross-section and the cushions at their sides extend on the sides of the leaf spring on the inside of the side members of the hanger.

9. An air-ride suspension as set forth in claim 1 wherein the axle at each end thereof is secured to an axle seat secured to the respective leaf spring at the free end thereof, said seat comprising a top plate engaging the bottom of the leaf spring, side plates extending up above the top plate forming a channel receiving the leaf spring and extending down from the top plate, the side plates having recesses receiving the axle, an air spring supporting plate on the top of the leaf spring cantilevered inward from the leaf spring in a direction parallel to the longitudinal axis of the axle, fasteners securing the top plate and the air spring supporting plate to the leaf spring, the link means being pin-connected to the seat between the side plates thereof.

10. An air-ride suspension as set forth in claim 1 wherein each link means, adjacent its connection to the hanger, and each lower elastomeric cushion are interfitted to limit the longitudinal movement of the lower elastomeric cushion.

11. An air-ride suspension as set forth in claim 10 wherein each link means is pivotally connected to the respective hanger by being pinned in the respective hanger between the side members thereof and each lower elastomeric cushion is mounted in the respective hanger on the end of the link means which is pinned in the hanger.

12. An air-ride suspension as set forth in claim 11 wherein each lower elastomeric cushion has a downwardly opening recess in its bottom and the end of the respective link means pinned in the respective hanger has a lobe received in said recess.

13. An air-ride suspension as set forth in claim 12 wherein each lower elastomeric cushion has an upwardly opening groove in its upper face extending longitudinally with respect to the vehicle receiving the respective leaf spring.

14. An air-ride suspension as set forth in claim 13 wherein the upper elastomeric cushion has a downwardly opening groove in the bottom thereof extending longitudinally with respect to the vehicle receiving the leaf spring.

15. An air-ride suspension as set forth in claim 14 wherein the head of each hanger comprises a sheet metal member of channel shape in vertical cross section longitudinally of the vehicle having a web constituting the bottom wall of the head and flanges extending up at opposite sides of said web, the web being formed with an upwardly offset portion forming said recess, the side members of the hanger being constituted by sheet metal plates welded to the end edges of the web and flanges of the head.

16. An air-ride suspension as set forth in claim 15 wherein the leaf spring is of rectangular cross-section and the cushions at their sides extend on the sides of the leaf spring on the inside of the side members of the hanger.

17. An air-ride suspension for a vehicle comprising:
at least one pair of hangers, one for the left side and the other for the right side of the vehicle,
each hanger comprising a head and a pair of side members at opposite sides of the head extending down from the head, one of the hangers being mounted extending down from the bottom of the vehicle adjacent its left side and the other being mounted extending down from the bottom of the vehicle adjacent its right side, the hangers being aligned transversely with respect to the vehicle and with the side members of the hangers spaced transversely with respect to the vehicle;

at least one pair of composite leaf springs, one for the left and one for the right side of the vehicle, each having an upwardly facing surface and a downwardly facing surface, each composite leaf spring comprising fibers embedded in a resin matrix, the fibers extending lengthwise of the spring;

means for resiliently mounting each leaf spring in a respective hanger with the leaf spring extending longitudinally of the vehicle between the side members of the hanger below the head, said resilient mounting means comprising a lower elastomeric cushion retained in the hanger below the leaf spring engaged by the downwardly facing surface of the leaf spring and an upper elastomeric cushion retained in the hanger above the leaf spring and between the leaf spring and the head of the hanger and engaging the upwardly facing surface of the leaf spring, the portion of the leaf spring extending between said elastomeric members being resiliently cushioned therebetween and thereby resiliently yieldable up and down in the hanger, the leaf springs being resiliently mounted in the hangers generally at the center of length of the leaf springs and extending generally equally forward and rearward from the hangers, and having free ends spaced longitudinally with respect to the vehicle from the hangers and aligned transversely with respect to the vehicle, said head of each hanger having a downwardly opening recess therein and the upper elastomeric cushion being pocketed in the recess to limit the longitudinal movement of the upper elastomeric cushion;

an axle secured to the leaf springs adjacent their forward free ends and an axle secured to the leaf springs adjacent their rearward free ends, said axles extending transversely with respect to the vehicle;

air springs interposed between the leaf springs and the body of the vehicle adjacent both the forward and rearward free ends of the leaf springs; and means limiting the longitudinal movement of each leaf spring in the respective hanger comprising link means pivotally connected at one end to the respective hanger and at the other end to the leaf spring adjacent one of the free ends of the leaf spring.

18. An air-ride suspension as set forth in claim 17 wherein the upper elastomeric cushion has a downwardly opening groove in the bottom thereof extending longitudinally with respect to the vehicle receiving the leaf spring, the head of each hanger comprising a sheet metal member of channel shape in vertical cross section longitudinally of the vehicle having a web constituting the bottom wall of the head and flanges extending up at opposite sides of said web, the web being formed with an upwardly offset portion forming said recess, the side members of the hanger being constituted by sheet metal plates welded to the end edges of the web and flanges of the head.

19. An air-ride suspension as set forth in claim 18 wherein each link means is pivotally connected to the respective hanger by being pinned in the respective hanger between the side members thereof and each lower elastomeric cushion is mounted in the respective hanger on the end of the link means which is pinned in the hanger.

20. An air-ride suspension as set forth in claim 19 wherein each lower elastomeric cushion has a downwardly opening recess in its bottom and the end of the respective link means pinned in the respective hanger has a lobe received in said recess, an upwardly opening groove in its upper face extending longitudinally with respect to the vehicle receiving the respective leaf spring, and wherein the leaf spring is of rectangular cross-section and the cushions at their sides extend on the sides of the leaf spring on the inside of the side members of the hanger.

21. An air-ride suspension for a vehicle comprising:

at least one pair of hangers, one for the left side and the other for the right side of the vehicle;

each hanger comprising a head and a pair of side members at opposite sides of the head extending down from the head, one of the hangers being mounted extending down from the bottom of the vehicle adjacent its left side and the other being mounted extending down from the bottom of the vehicle adjacent its right side, the hangers being aligned transversely with respect to the vehicle and with the side members of the hangers spaced transversely with respect to the vehicle, at least one pair of composite leaf springs, one for the left and one for the right side of the vehicle, each having an upwardly facing surface and a downwardly facing surface;

each composite leaf spring comprising fibers embedded in a resin matrix, the fibers extending lengthwise of the spring;

means for resiliently mounting each leaf spring in a respective hanger with the leaf spring extending longitudinally of the vehicle between the side members of the hanger below the head, p1 said resilient mounting means comprising a lower elastomeric cushion retained in the hanger below the leaf spring engaged by the downwardly facing surface of the leaf spring and an upper elastomeric cushion retained in the hanger above the leaf spring and between the leaf spring and the head of the hanger and engaging the upwardly facing surface of the leaf spring;

the portion of the leaf spring extending between said elastomeric members being resiliently cushioned therebetween and thereby resiliently yieldable up and down in the hanger;

the leaf springs having free ends spaced longitudinally with respect to the vehicle from the hangers and aligned transversely with respect to the vehicle, said head of each hanger having a downwardly opening recess therein and the upper elastomeric cushion being pocketed in the recess to limit the longitudinal movement of the upper elastomeric cushion;

an axle secured to the leaf springs adjacent one their ends and extending transversely with respect to the vehicle;

air springs interposed between the leaf springs and the vehicle adjacent said one end of the leaf springs; and means limiting the longitudinal movement of each leaf spring in the respective hanger comprising link means pivotally connected at one end to the respective hanger and at the other end to the leaf spring adjacent said one end of the leaf spring where the axle is secured to the leaf spring.

22. An air-ride suspension as set forth in claim 21 the upper elastomeric cushion has a downwardly opening groove in the bottom thereof extending longitudinally with respect to the vehicle receiving the leaf spring, the head of each hanger comprising a sheet metal member of channel shape in vertical cross section longitudinally of the vehicle having a web constituting the bottom wall of the head and flanges extending up at opposite sides of said web, the web being formed with an upwardly offset portion forming said recess, the side members of the hanger being constituted by sheet metal plates welded to the end edges of the web and flanges of the head.

23. An air-ride suspension as set forth in claim 21 wherein each link means is pivotally connected to the respective hanger by being pinned in the respective hanger between the side members thereof and each lower elastomeric cushion is mounted in the respective hanger on the end of the link means which is pinned in the hanger.

24. An air-ride suspension as set forth in claim 23 wherein the upper elastomeric cushion has a downwardly opening groove in the bottom thereof extending longitudinally with respect to the vehicle receiving the leaf spring, the head of each hanger comprising a sheet metal member of channel shape in vertical cross section longitudinally of the vehicle having a web constituting the bottom wall of the head and flanges extending up at opposite sides of said web, the web being formed with an upwardly offset portion forming said recess, the side members of the hanger being constituted by sheet metal plates welded to the end edges of the web and flanges of the head.

25. An air-ride suspension for a vehicle comprising:
two pairs of hangers, the first pair constituting a rearward pair of hangers and the second pair constituting a forward pair of hangers spaced longitudinally with respect to the vehicle,
each hanger comprising a head and a pair of side members at opposite sides of the head extending down from the head,
two of the hangers being mounted extending down from the bottom of the vehicle adjacent its left side and the other two being mounted extending down from the bottom of the vehicle adjacent its right side, each pair of hangers being aligned transversely with respect to the vehicle and with the side members of respective hangers spaced transversely with respect to the vehicle;
at least one pair of composite leaf springs, one for the left and one for the right side of the vehicle, each having an upwardly facing surface and a downwardly facing surface,
each composite leaf spring comprising fibers embedded in a resin matrix, the fibers extending lengthwise of the spring,
means for resiliently mounting each leaf spring in respective hangers with the leaf springs extending through both pairs of hangers and extending generally equally rearward from the rearward pair of hangers and forward from the forward pair of hangers, the leaf springs having forward and rearward free ends,
said resilient mounting means comprising a lower elastomeric cushion retained in the hanger below the leaf spring engaged by the downwardly facing surface of the leaf spring and an upper elastomeric cushion retained in the hanger above the leaf spring and between the leaf spring and the head of the hanger and engaging the upwardly facing surface of the leaf spring,
the portion of the leaf spring extending between said elastomeric members being resiliently cushioned therebetween and thereby resiliently yieldable up and down in the hanger,
the free ends of the leaf springs being spaced longitudinally with respect to the vehicle from the hangers and aligned transversely with respect to the vehicle,
said head of each hanger having a downwardly opening recess therein and the upper elastomeric cushion being pocketed in the recess to limit the longitudinal movement of the upper elastomeric cushion;
an axle secured to the leaf springs adjacent their rearward free ends and an axle secured to the leaf springs adjacent their forward free ends;
air springs interposed between the leaf springs and the body of the vehicle adjacent both the forward and rearward free ends of the leaf springs; and
means limiting the longitudinal movement of each leaf spring in the respective hanger comprising link means pivotally connected at one end to the respective rearward hanger and at its other end to the respective leaf spring adjacent the rearward free end of the leaf spring.

26. An air-ride suspension as set forth in claim 25 wherein the upper elastomeric cushion has a downwardly opening groove in the bottom thereof extending longitudinally with respect to the vehicle receiving the leaf spring, the head of each hanger comprising a sheet metal member of channel shape in vertical cross section longitudinally of the vehicle having a web constituting the bottom wall of the head and flanges extending up at opposite sides of said web, the web being formed with an upwardly offset portion forming said recess, the side members of the hanger being constituted by sheet metal plates welded to the end edges of the web and flanges of the head.

27. An air-ride suspension as set forth in claim 25 wherein each link means is pivotally connected to the respective hanger by being pinned in the respective hanger between the side members thereof and each lower elastomeric cushion is mounted in the respective hanger on the end of the link means which is pinned in the hanger.

28. An air-ride suspension as set forth in claim 27 wherein each lower elastomeric cushion has a downwardly opening recess in its bottom and the end of the respective link means pinned in the respective hanger has a lobe received in said recess, an upwardly opening groove in its upper face extending longitudinally with respect to the vehicle receiving the respective leaf spring, and wherein the leaf spring is of rectangular cross-section and the cushions at their sides extend on the sides of the leaf spring on the inside of the side members of the hanger.

29. An air-ride suspension as set forth in claim 25 wherein the first pair of hangers is spaced generally one-fourth the spacing of the rearward and forward axles forward of the rear axle and the second pair of hangers is spaced generally one-fourth the spacing of the rearward and forward axles rearward of the forward axle.

30. An air-ride suspension for a vehicle comprising:

two pairs of hangers, the first pair constituting a rearward pair of hangers and the second pair constituting a forward pair of hangers spaced longitudinally with respect to the vehicle;

each hanger comprising a head and a pair of side members at opposite sides of the head extending down from the head, two of the hangers being mounted extending down from the bottom of the vehicle adjacent its left side and the other two being mounted extending down from the bottom of the vehicle adjacent its right side, each pair of hangers being aligned transversely with respect to the vehicle and with the side members of respective hangers spaced transversely with respect to the vehicle;

at least one pair of composite leaf springs, one for the left and one for the right side of the vehicle, each having an upwardly facing surface and a downwardly facing surface, each composite leaf spring comprising fibers embedded in a resin matrix, the fibers extending lengthwise of the spring, means for resiliently mounting each leaf spring in respective hangers with the leaf spring extending through both pairs of hangers and extending generally equally rearward from the rearward pair of hangers and forward from the forward pair of hangers, the leaf springs having forward and rearward free ends, said resilient mounting means comprising a lower elastomeric cushion retained in the hanger below the leaf spring engaged by the downwardly facing surface of the leaf spring and an upper elastomeric cushion retained in the hanger above the leaf spring and between the leaf spring and the head of the hanger and engaging the upwardly facing surface of the leaf spring, the portion of the leaf spring extending between said elastomeric members being resiliently cushioned therebetween and thereby resiliently yieldable up and down in the hanger, the free ends of the leaf springs being spaced longitudinally with respect to the vehicle from the hangers and aligned transversely with respect to the vehicle, said head of each hanger having a downwardly opening recess therein and the upper elastomeric cushion being pocketed in the recess to limit the longitudinal movement of the upper elastomeric cushion;

a rear axle secured to the leaf springs adjacent their rearward free ends, a forward axle secured to the leaf springs adjacent their forward free ends, and an intermediate axle secured to the leaf springs intermediate the rearward and forward pairs of hangers;

air springs interposed between the leaf springs and the body of the vehicle adjacent both the forward and rearward free ends of the leaf springs and between the rearward and forward pairs of hangers; and means limiting the longitudinal movement of each leaf spring in the respective hanger comprising link means pivotally connected at one end to the respective forward hanger and at the other end to the leaf spring adjacent the intermediate axle.

31. An air-ride suspension as set forth in claim 30 wherein the upper elastomeric cushion has a downwardly opening groove in the bottom thereof extending longitudinally with respect to the vehicle receiving the leaf spring, the head of each hanger comprising a sheet metal member of channel shape in vertical cross section longitudinally of the vehicle having a web constituting the bottom wall of the head and flanges extending up at opposite sides of said web, the web being formed with an upwardly offset portion forming said recess, the side members of the hanger being constituted by sheet metal plates welded to the end edges of the web and flanges of the head.

32. An air-ride suspension as set forth in claim 30 wherein each link means is pivotally connected to the respective hanger by being pinned in the respective hanger between the side members thereof and each lower elastomeric cushion is mounted in the respective hanger on the end of the link means which is pinned in the hanger.

* * * * *